United States Patent [19]

Engel et al.

[11] 4,239,178
[45] Dec. 16, 1980

[54] MANUAL ACTUATOR FOR MOTOR DRIVEN CONTROL VALVE

[75] Inventors: Hans O. Engel; Wolfgang Lueneburg, both of, Hanau, Fed. Rep. of Germany

[73] Assignee: Honeywell Inc., Minneapolis, Minn.

[21] Appl. No.: 38,438

[22] Filed: May 14, 1979

[30] Foreign Application Priority Data

May 13, 1978 [DE] Fed. Rep. of Germany ....... 2821100

[51] Int. Cl.³ ....................... F16K 31/52; F16K 31/14
[52] U.S. Cl. ........................................ 251/14; 74/89.15
[58] Field of Search ................. 251/14; 74/89.15, 625, 74/424.8 VA

[56] References Cited

U.S. PATENT DOCUMENTS

| | | | |
|---|---|---|---|
| 1,648,710 | 11/1927 | Wright | 251/14 |
| 2,319,336 | 5/1943 | McCullough | 251/14 X |
| 3,198,034 | 8/1965 | DeWitte et al. | 74/625 |

FOREIGN PATENT DOCUMENTS 777464  6/1957  United Kingdom ................... 251/14

*Primary Examiner*—Arnold Rosenthal
*Attorney, Agent, or Firm*—Laurence J. Marhoefer; Mitchell J. Halista; Lockwood D. Burton

[57] ABSTRACT

A manual actuator for a motor driven control valve has a fork-shaped lever-type actuating means pivotally mounted on a single valve motor support stud passing between the legs of the fork-shaped actuating means. One end of the legs of the fork-shaped actuating means is formed as a cam surface to transmit a valve actuating force to a cam support attached to a valve stem driven by the valve motor. The other end of the legs of the actuating means are each rotatably attached to respective external trunnions on an internally threaded nut threaded on a threaded control rod. One end of the control rod is attached to a handwheel while the other end of the control rod is held in a ball and socket connection supported on the valve stud and spaced from the pivot for the actuating means.

10 Claims, 5 Drawing Figures

MANUAL ACTUATOR FOR MOTOR DRIVEN CONTROL VALVE

BACKGROUND OF THE INVENTION

1. Field of the Invention

The present invention relates to control valves. More specifically, the present invention is directed to a control valve having a motor drive and a manual drive.

2. Description of the Prior Art

There are known control valves which besides a motor actuator acting upon the valve stem of the valve in an axial direction, have in addition, a hand, or manual, actuator that is arranged laterally to the support studs of the valve motor actuator. In the known devices the manual actuator is attached to a pair of valve motor support studs and extends at a right angle to a plane defined by the studs. Thus, in the known device the space is limited in which further devices, e.g., position controllers, position indicators etc., may be arranged on the control valve.

SUMMARY OF THE INVENTION

It is an object of the present invention to achieve a motor driven control valve with a laterally mounted manual actuator which provides a relative simple weight-saving design and which enables the attachment of further devices at the valve studs.

It is another object of the present invention to provide a manual valve actuator that is usable in a simple interchangeable manner for direct as well as for reverse operation.

In accomplishing these and other objects, there has been provided, in accordance with the present invention, a control valve actuator having a valve housing, a valve stem projecting from the housing, a motor actuator mounted by spaced apart studs on the valve housing, the motor actuator acting by means of the valve stem on the valve and a manual actuator laterally mounted on the studs and acting on the valve stem by means of a lever-type actuating means terminating in a cam contacting the valve stem, wherein in that the lever-type actuating means is pivotally attached to one of the studs and is shaped as a fork with a pair of fork legs extending past the stud to the valve stem and terminating at one end to form the cam.

BRIEF DESCRIPTION OF THE DRAWINGS

A better understanding of the present invention may be had when the following detailed description is read in connection with the accompanying drawings, in which, FIG. 1a is a lateral view partly in cross-section, of an example of a valve actuator according to the present invention;

FIG. 1b is a partly plan view on the actuator shown in FIG. 1a;

FIG. 1c is a view partly in cross-section in direction of arrow C of the actuator shown in FIG. 1a;

DESCRIPTION OF THE PREFERRED EMBODIMENT

DETAILED DESCRIPTION

Figure 1:
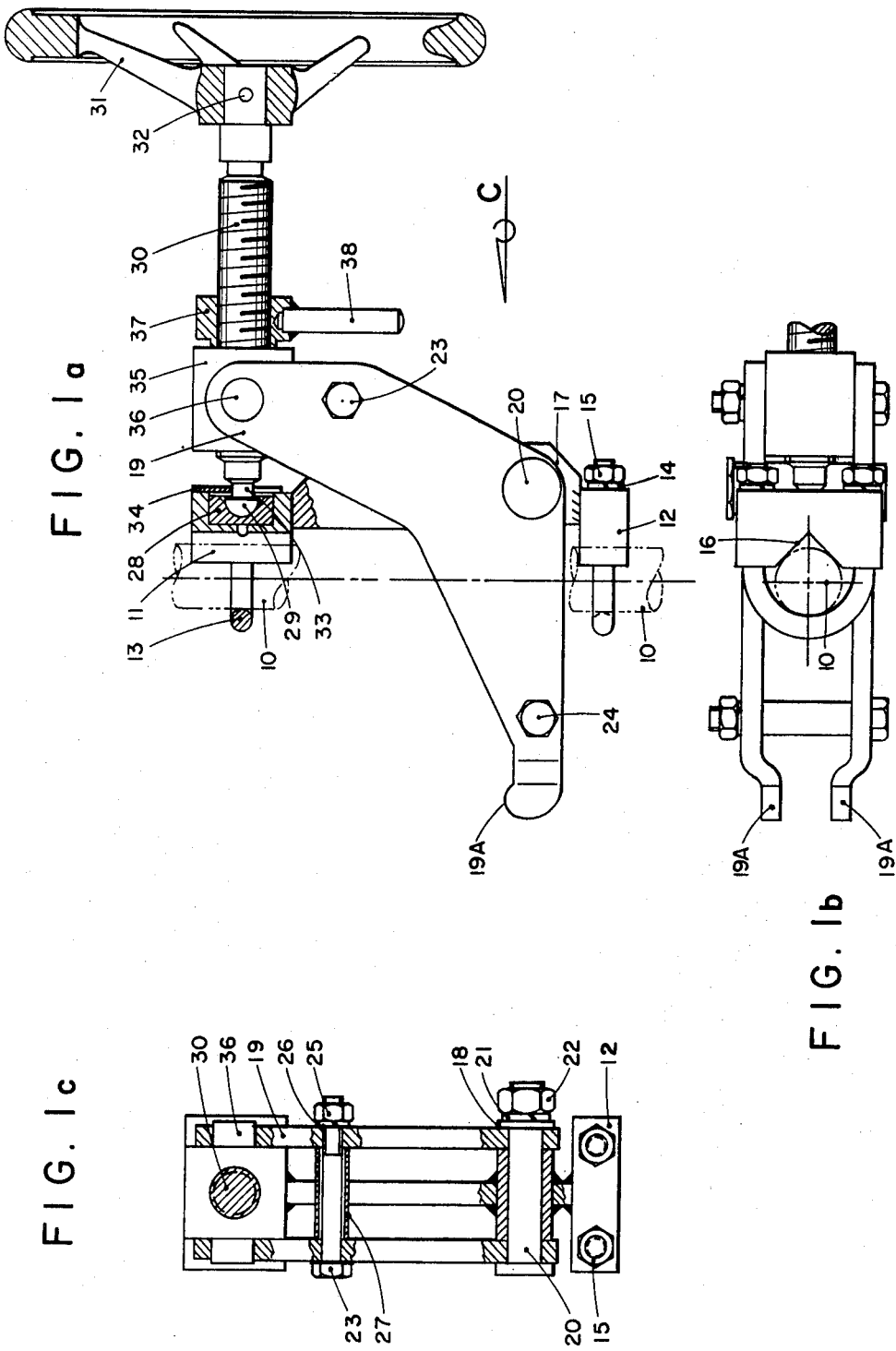

According to FIGS. 1a to 1c, two spaced apart prismatic bodies 11 and 12 are attached to a single valve stud 10. The attachment is made by means of U-shaped clamps 13 which partially encircle the stud 10 and extend through bores in the prismatic bodies 11 and 12. The U-shaped clamps 13 are threaded at their ends, and they are tightened onto the stud 10 and the bodies 11 and 12 by nuts 15 abuttings on washers 14 in contact with the prismatic bodies 11 and 12. The prismatic bodies 11 and 12 are each provided with V-shaped cutouts 16 to accommodate the stud 10 therein under the clamps 13. Between the prismatic bodies 11 and 12 extends a connecting rib 17, which supports a fixed bearing bushing 18 transverse to it. A bolt 20 extends through the bearing bushing 18 and through a pair of legs of a fork-shaped lever-type actuating means 19 and is secured by a washer 21 and a nut 22 to form a stationary pivot for the fork-shaped lever-type actuating means 19. The legs of the fork-shaped actuating means 19 extend past respective sides of the valve stud 10. The free end of the legs of the fork-shaped actuating means 19 form a cam-shaped surface 19A to transmit a valve actuating force as described hereinafter with respect to FIGS. 2 and 3. Two further threaded bolts 23 and 24 together with nuts 25 and washers 26 are located in holes at respective opposite ends of the actuating means 19 to clamp the fork-shaped actuating means 19 against distance, or spacing, bushings 27.

On the side away from the valve stud 10, the prismatic body 11 has a recess in which a cup-shaped body 28 is inserted. Within the cup-shaped body 28, the spherical head end 29 of a threaded rod 30 is engaged to form a ball and socket connection. On the other end of the threaded rod 30, a handwheel 31 is attached by means of a transverse pin 32 which provides a driving connection with the threaded rod 30. A reduced portion 33 of the threaded rod 30 adjacent of the spherical head 29 passes beneath a plate 34 having an U-shaped cutout surrounding the reduced portion 33 and being attached to the prismatic body 11. It is the purpose of the plate 34 to prevent, or restrain, tilting of the spherical head 29 in the cup-shaped body 28 and, consequently, of the whole actuator if the cam-shaped free ends of the fork-shaped lever-type actuating means 19 are not supported.

A prismatic internally threaded nut, or die, 35 is threaded on the threaded rod 30. By reason of its dimensions, the die 35 fits between the legs of the fork-shaped lever-type actuating means 19, and the actuating means 19 is pivotally mounted to the die 35 by means of laterally extending die trunnions 36 passing through respective legs of the actuating means 19. A lock nut 37 provided with a control handle 38 is threaded on the control rod 30 and is displaceable in an axial direction on the threaded rod 30 to limit the travel path of the die 35 and, therefor, the stroke of the manual actuator.

Figure 2:
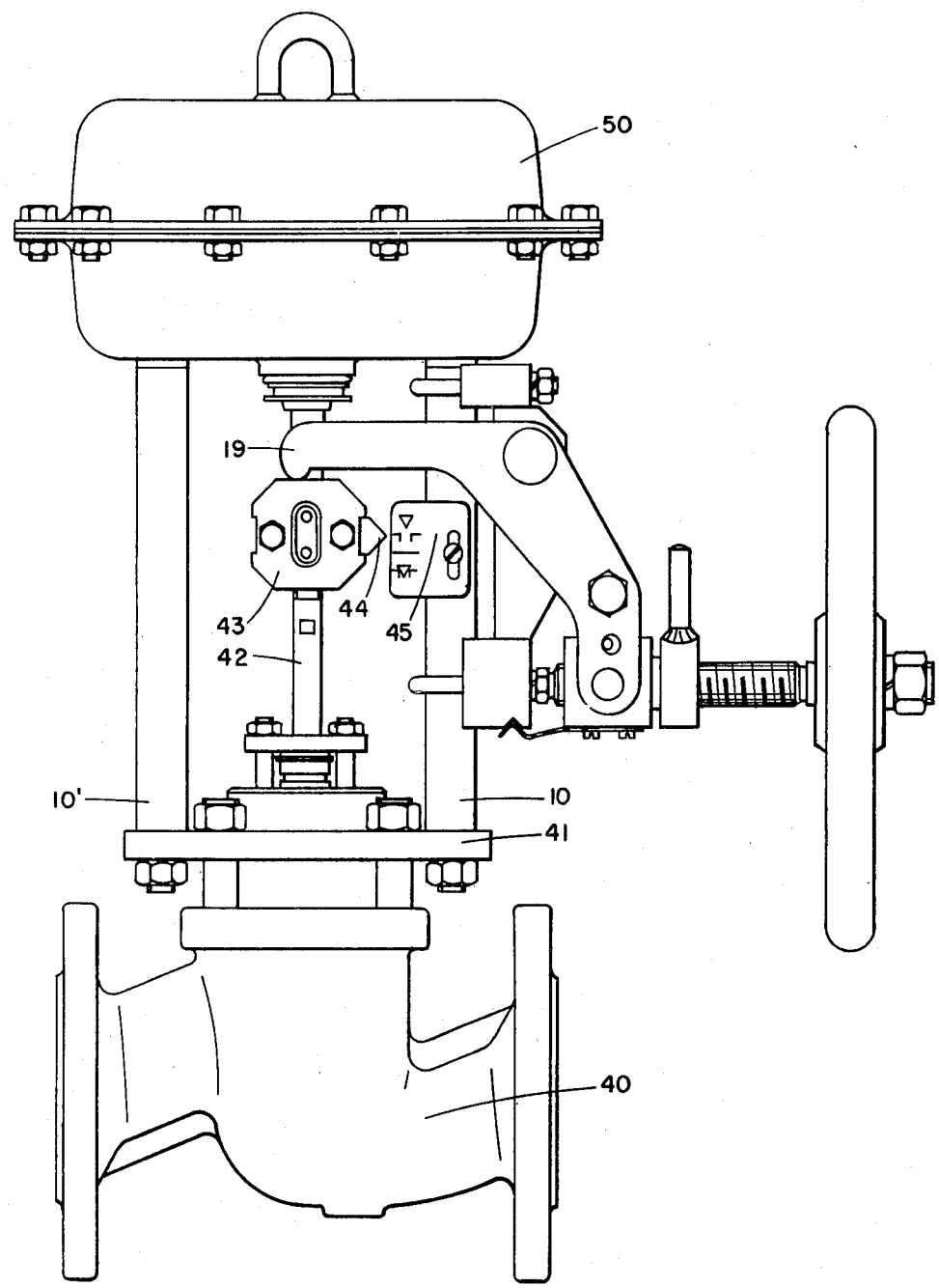
FIG. 2 is a side view of a complete control valve for direct operation having the laterally mounted manual actuator of FIGS. 1a, 1b and 1c.
Figure 3:
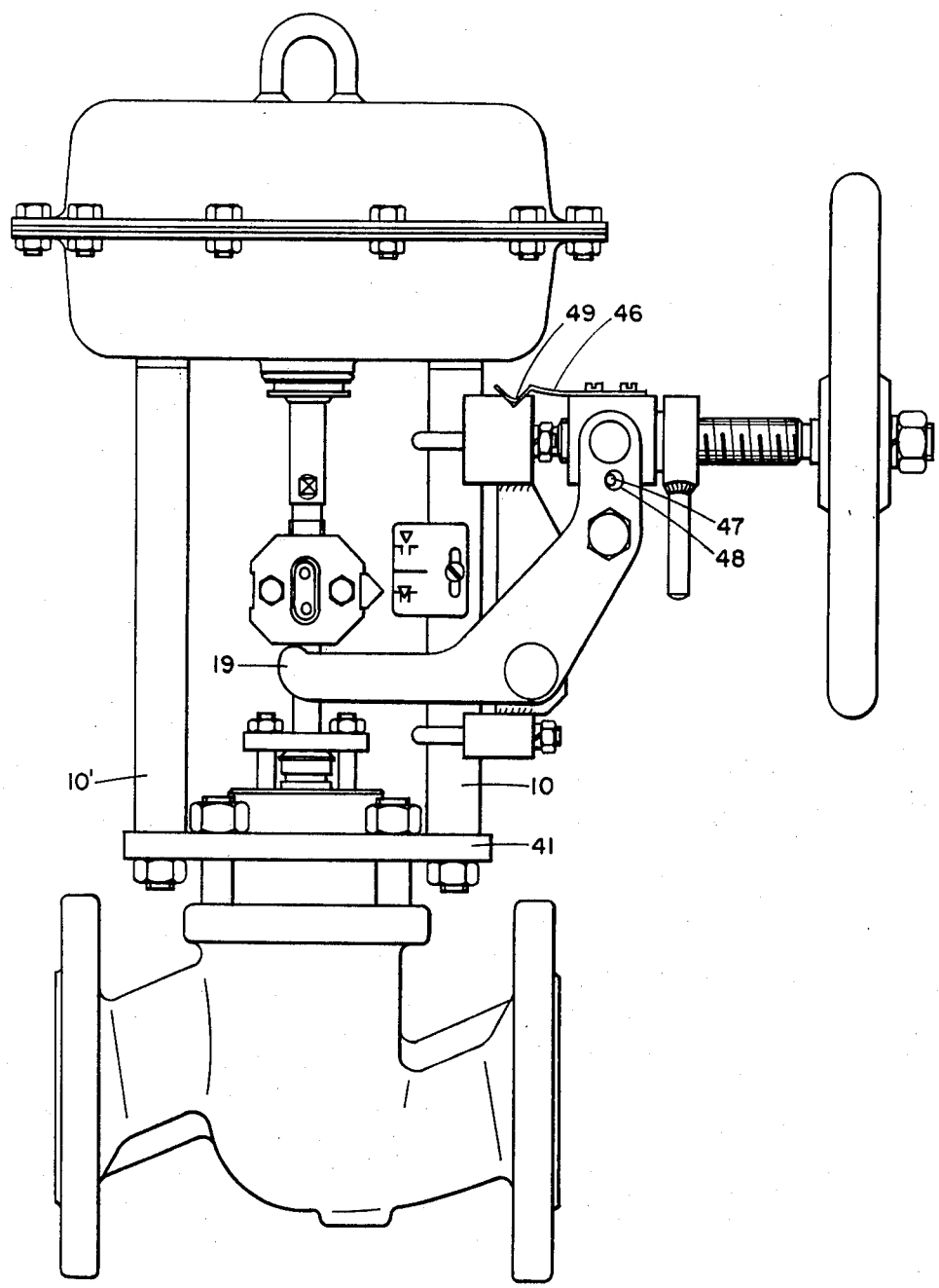
FIG. 3 is a side view of a complete control valve for reverse operation having the laterally mounted manual actuator of FIGS. 1a, 1b, and 1c.

The mounting of the manual actuator for actuation of a direct and a reverse operating control valve is shown in FIGS. 2 and 3, respectively. As shown in FIG. 2, on the traverse flange 41 of a valve body 40 there are attached at least two studs 10 and 10'. A pneumatic valve actuator, or motor, 50 is supported on the studs 10 and 10' for actuating, by means of a valve stem 42, the valve plug (not shown) within the valve body 40. A cam support, or engaging, block 43 is fixed to the valve stem 42 and has attached thereto a pointer 44 for indicating the valve position with regard to a scale 45 fixed on the stud 10. The fork-shaped lever-type actuating means 19 overlies and contacts the engaging block 43 from the top in the arrangement according to FIG. 2 (direction operation) and from the bottom in the arrangement according to FIG. 3 (reverse operation). The contact between the actuating means 19 and the cam engaging block 43 is provided by the cam shaped ends 19A on the adjacent fork legs of the actuating means 19 bearing on the cam engaging block 43.

In FIGS. 2 and 3, a modification of the manual actuator is shown over that shown in FIG. 1a to 1c as the U-shaped plate 34 has been omitted. The function of the plate 34 in restraining the free movement of the whole actuator is taken over by a leaf spring 46 which is attached to the die 35 and is arranged to engage a V-shaped groove 49 in the prismatic body 11. A pin 47 is inserted in the die 35 and extends transversely into an enlarged bore 48 in the fork-shaped lever-type actuating means 19 to allow a limited play thereof on the pin 47.

Accordingly, it may be seen that there has been provided, in accordance with the present invention, an improved manual actuator for a motor driven valve capable of operating in a direct or reverse actuation.

The embodiments of the invention in which an exclusive property or privilege is claimed are defined as follows:

1. A control valve actuator comprising
   a valve housing,
   a valve stem projecting from said housing,
   a motor actuator mounted by spaced apart studs on said valve housing, said motor actuator acting by means of said valve stem on the valve, and
   a manual actuator laterally mounted on the studs and acting on said valve stem by means of a lever-type actuating means terminating in a cam contacting said valve stem, characterized in that the lever-type actuating means is pivotally attached to one of the studs and is shaped as a fork having a pair of legs extending past respective sides of said one stud to said valve stem and terminating at one end as said cam.

2. A control valve actuator according to claim 1 and further characterized in that the manual actuator is attached to the one stud by means of two superposed and spaced apart prismatic bodies and that a rib is arranged between said prismatic bodies to support a stationary pivot for the fork-shaped lever-type actuating means.

3. A control valve actuator according to claim 2 and further characterized by a threaded rod attached to a hand wheel at one end and rotatably abutting against one of said prismatic bodies at the other end, said rod passing through an internally threaded die arranged between the legs of said fork-shaped lever-type actuating means and pivotally mounted to said lever-type actuating means.

4. A control valve actuator according to claim 3 and further characterized in that said one of said prismatic body includes a cup-shaped body in which said other end of said threaded rod is engaged with a spherical head.

5. A control valve actuator according to claim 4 and further characterized by a restraining means for limiting a pivotal movement of the threaded rod together with the hand wheel induced by gravity.

6. A control valve actuator according to claim 5 and further characterized in that said restraining means includes a plate having a U-shaped cutout for admitting said threaded rod and being fixed to said one of said prismatic body whereby said plate overhangs said threaded rod.

7. A control valve actuator according to claim 5 and further characterized in that said restraining means includes a spring engaging said die and said one of said prismatic bodies and a pin extending from the die into an enlarged bore in the fork-shaped lever-type actuating means.

8. A control valve actuator according to claim 3 and further characterized by a lock nut adjustably on mounted said threaded rod for limiting the travel path of said die.

9. A control valve actuator according to claim 1 and further characterized in that said manual actuator is usable on the same valve stud for a reverse acting valve by means of a 180° rotating of said actuator on said one stud.

10. A control valve actuator according to claim 1 and further characterized by a cam engaging block attached to said valve stem to transfer a motion of said cam to said valve stem.

* * * * *